United States Patent [19]

Yokosuka et al.

[11] Patent Number: 4,918,393

[45] Date of Patent: Apr. 17, 1990

[54] PHASE CONTROL DEVICE

[75] Inventors: Yasushi Yokosuka; Yasuyuki Kozima, both of Hitachi; Kazuhiko Takaoka, Yokohama, all of Japan

[73] Assignee: Hitachi, Ltd., Tokyo, Japan

[21] Appl. No.: 272,537

[22] Filed: Nov. 17, 1988

[30] Foreign Application Priority Data

Nov. 18, 1987 [JP] Japan .................. 62-289380

[51] Int. Cl.[4] ............................................. H03D 3/00
[52] U.S. Cl. ..................... 329/318; 331/11; 329/307
[58] Field of Search ............... 329/110, 122, 123; 375/81; 455/260, 337; 331/11

[56] References Cited

U.S. PATENT DOCUMENTS 3,454,710  7/1969  Gassmann ............... 329/123 X

OTHER PUBLICATIONS

"Carrier Recovery in 9600 bps MODEM", Paper No. 1985, General Meeting of the Institute of Electronics and Communication Engineers of Japan, 1981.

*Primary Examiner*—Eugene R. LaRoche
*Assistant Examiner*—Robert J. Pascal
*Attorney, Agent, or Firm*—Kenyon & Kenyon

[57] ABSTRACT

A first phase control loop not including a signal delay part and a second phase control loop including a signal delay part such as an automatic equalizer are formed independently of each other in a demodulator incorporated in a MODEM. The first and second phase control loops are arranged in such a relation that an input to the second phase control loop is not affected by an output of the first phase control loop, so that correction of a frequency offset by the first phase control loop and correction of a frequency jitter by the second phase control loop can be carried out independently of each other. This arrangement facilitates the design of the first and second phase control loops and improves the stability of the phase control system.

6 Claims, 4 Drawing Sheets

PHASE CONTROL DEVICE

BACKGROUND OF THE INVENTION

This invention relates to a phase control device incorporated in a demodulator of a MODEM. More particularly, this invention relates to a phase control device suitable for incorporation in a demodulator which includes a signal delay time in its path of a demodulated data signal between a demodulation part and a data identification/decision part.

A paper No. 1985 entitled "Carrier Recovery in 9600 bps MODEM" reported in a general meeting of the Institute of Electronics and Communication Engineers of Japan, held in 1981, proposes a phase control device suitable for use in a demodulator of a MODEM so as to improve the stability of a data signal receiving system as well as the capability of phase control. According to the proposed phase control device, a relatively slow phase fluctuation, such as a frequency offset of a carrier of a modulated signal, is removed by a phase control system which cancels such a variation before the modulated signal is applied to an automatic equalizer. On the other hand, a phase fluctuation having a relatively high variable frequency, such as a carrier jitter, is removed by another phase control system which cancels such a variation after the demodulated signal is processed by the automatic equalizer.

Thus, in the prior art phase control device, two phase control systems commonly-connected at part of their own loops are provided so as to improve the stability of the signal receiving system without lowering the capability of suppressing the carrier phase jitter.

However, the structure of the prior art phase control device is such that a phase control loop not including a signal delay part is incorporated in another phase control loop including such a signal delay part. Because of the above structure, these two phase control loops cannot be handled as loops that are independent of each other. Therefore, the overall characteristics of the prior art phase control device differ inevitably from the specifically designed characteristics of the individual phase control loops, and the design for improving the phase control capability must be made while taking into account the signal delay by the signal delay part as well as the interaction between the two phase control loops. Further, the prior art phase control device has such another problem that its design is very difficult because complex signal processing is required so as to achieve the desired stability of the signal receiving system.

SUMMARY OF THE INVENTION

It is an object of the present invention to provide a phase control device which can be easily designed to meet the requirements for improving the capability of phase control and the stability of a signal receiving system.

According to the present invention, two phase control loops, partly commonly-connected to each other, can operate independently of each other. That is, the structure of the phase control device of the present invention is such that an input to one of the two phase control loops is not affected by an output from the other phase control loop. Therefore, the already established technique of designing, for example, primary and secondary PLL control can be directly utilized, without any modification, for the design of the phase control device of the present invention so that the desired phase control performance can be realized. Further, the phase control characteristics optimized to deal with various requirements can be easily achieved in a simple structure with high stability.

According to the present invention, the above object is attained by an arrangement in which phase error signals which are independent of each other are applied as inputs to the two phase control loops respectively, whereas, in the case of the prior art phase control device, the same phase error signal is applied as an input to each of the two phase control loops. That is, the phase control device of the present invention which attains the above object includes a phase control loop including a signal delay part and a phase control loop not including such a signal delay part, and the phase error signal applied as an input to the former phase control loop is generated from a phase comparator in that phase control loop and is not subjected to the effect of phase correction by the latter phase control loop, thereby providing the two phase error signals which are independent of each other. Thus, the inputs to the two phase control loops are independent of each other, so that these two phase control loops can operate independently of each other.

In the phase control device of the present invention, the phase control loop including a signal delay attributable to the presence of, for example, signal delay elements in an automatic equalizer and the other phase control loop not including such a signal delay constitute respectively independent phase control circuits as described above, so that undesirable interaction between these two phase control systems can be cancelled. Therefore, the individual phase control loops operate with respectively independent characteristics, thereby improving the stability of the signal receiving system. Also, the already established technique of designing primary and secondary PLL control can be directly utilized, without any modification, for the design of the individual phase control systems, so that the designing to achieve the desired operational performance can also be facilitated.

DETAILED DESCRIPTION

A preferred embodiment of the phase control device according to the present invention will be described in detail with reference to FIGS. 1 to 4.

Figure 1:
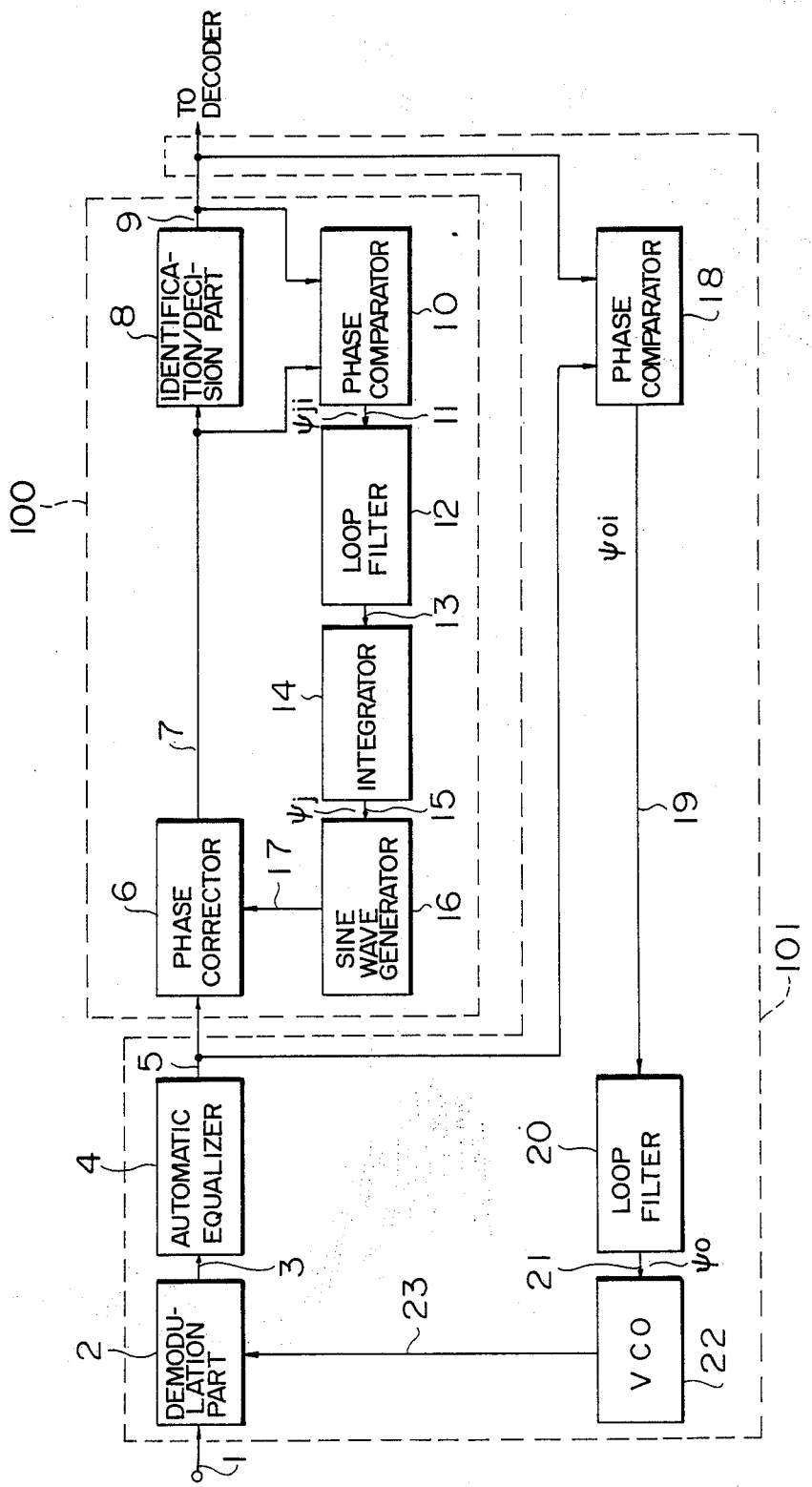
FIG. 1 is a block diagram showing the structure of an embodiment of the phase control device according to the present invention.

Referring to FIG. 1 showing the structure of a first embodiment of the phase control device of the present invention when applied to a demodulator, reference numerals 1, 2, 4, 6, 8, 10, 12, 14, 16, 18, 20 and 22 designate a demodulated signal input terminal, a demodulation part, an automatic equalizer, a phase corrector, an identification/decision part, a first phase comparator, a first loop filter, an integrator, a sine wave generator, a second phase comparator, a second loop filter, and a VCO (voltage controlled oscillator), respectively. Numeral 100 designates a first phase control loop which does not include a signal delay part, and 101 designates a second phase control loop which includes such a signal delay part.

Figure 2:
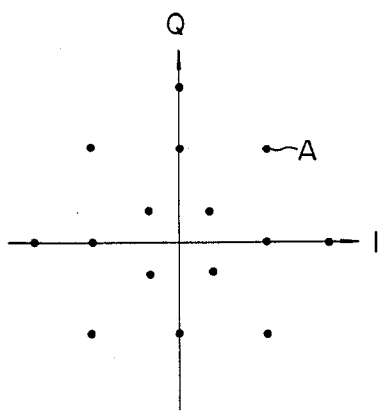
FIG. 2 is a diagram showing an arrangement of reference signal points used in a MODEM in the case of 9600-bps data transmission recommended as V.29 by the International Telegraph and Telephone Consultative Committee (CCITT).

The operation of the first embodiment of the present invention will now be described when the present invention is applied to 9600-bps data transmission through a MODEM using the quadrature amplitude modulation (QAM) type, as recommended by the CCITT, and having a reference signal point arrangement as shown in FIG. 2. The sixteen reference signal points shown in FIG. 2 correspond to 4-bit data of from "0000" to "1111" respectively demodulated from an input signal. Thus, in this case, each demodulating operation provides a 4-bit data output.

In the embodiment of the phase control device of the present invention shown in FIG. 1, a modulated data signal applied to the signal input terminal 1 is demodulated by the demodulation part 2 to appear as a baseband signal 3 which is applied to the automatic equalizer 4. A fixed equalizer may be used in place of the automatic equalizer 4. The baseband signal 3 applied to the automatic equalizer 4 is equalized, and a distortion-free output signal 5 appears from the automatic equalizer 4. This signal 5 is applied to the phase corrector 6, and a phase-corrected signal 7 appearing from the phase corrector 6 is applied to the identification/decision part 8. The identification/decision part 8 identifies and decides that the signal 7 corresponds to one of the reference signal points shown in FIG. 2, and the resultant identification/decision signal 9 is applied to a decoder (not shown). In the decoder (not shown), the signal 9 is decoded into 4-bit data corresponding to the decided reference signal point. In the present invention which is applied to the process for demodulation of a modulated signal applied to the signal input terminal 1, the phase control device is composed of the independent first and second phase control loops 100 and 101 so as to improve the quality of the demodulated signal.

In the case of the prior art phase control device described already, a phase error signal produced by a phase comparison of the input and output of identifying and deciding part is applied as an input to a first loop filter 12 in a first phase control loop not including a signal delay part, and the same phase error signal is also applied as an input to a second loop filter in a second phase control loop that includes the signal delay part. Therefore, in the prior art phase control device, a second phase control loop including an automatic equalizer 4 and is similar in some respects to the phase control loop 101 acts as a feedback circuit which is traced from a demodulation part to to the demodulation part through an automatic equalizer a, phase corrector a, first phase comparator, a second loop filter and a VCO, and the first phase control loop is included in the other second phase control loop that acts as the feedback circuit. Thus, the second phase control loop including the automatic equalizer and the first phase control loop not including the automatic equalizer are not independent of each other, and an undesirable interaction between these two phase control loops gives rise to lack of stability of their operation. Also, because separate designing of the control systems of the two phase control loops so as to obtain desired characteristics cannot be successfully achieved, fitting of the parameters of the loop filters becomes difficult from the aspect of design.

The phase control device of the present invention is advantageous over the prior art device in that the device can be simply designed and can operate with improved stability without lowering the high jitter suppression capability which is the merit of the provision of the two phase control loops. For this purpose, in the first embodiment of the present invention, an output signal 19 of the second comparator 18 is produced by comparing the phase of the output signal 9 of the identification/decision part 8 with that of the output signal 5 of the automatic equalizer 4 and is used as a phase error signal in the second phase control loop 101. This phase error signal 19 is free from the effect of phase error correction in the first phase control loop 100. Thus, the first and second phase control loops 100 and 101 are independent of each other. Because of the provision of the independent phase control loops 100 and 101, the design of control systems stably operable with improved performance can be facilitated.

The functions of the first and second phase control loops 100 and 101 will be briefly described with reference to FIG. 3.

Figure 3:
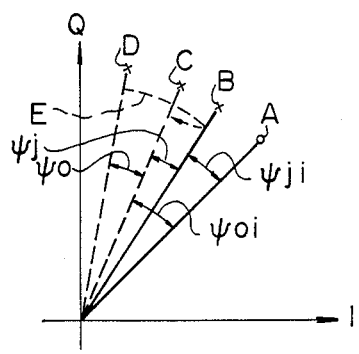
FIG. 3 illustrates the manner of phase correction by the individual phase control loops shown in FIG. 1 and illustrates also phase errors of inputs to the individual phase control loops.

In FIG. 3, the symbol D designates a demodulated signal point when a modulated signal applied to the signal input terminal 1 is demodulated without any phase control. First, the second phase control loop 101 acts to correct the signal point D, and this signal point D is shifted to a signal point C. Then, the first phase control loop 100 acts to shift the signal point C to a signal point B. The symbol A designates a reference signal point which is compared with the signal point B as a result of decision by the identification/decision part 8. It is supposed that this reference signal point A is the same as that shown in FIG. 2. The output signal 9 of the identification/decision part 8 represents the reference signal point A, and the phase difference $\psi_{ji}$ between the signal points A and B is the final phase error. Thus, the signal point D obtained when no phase control is applied during demodulation of the modulated input signal is finally shifted to the signal point B by the functions of the first and second phase control loops 100 and 101, and this signal point B can now be identified as the reference signal point A. As will be apparent from FIG. 3, the signal quality at the signal point B is remarkably improved over that at the signal point D as a result of the functioning of the first and second phase control loops 100 and 101.

The functions of the first and second phase control loops 100 and 101 will now be described in further detail.

First, the first phase control loop 100 is a closed loop which does not include the signal delay attributable to the presence of the signal delay elements included in the automatic equalizer 4. In this first phase control loop 100, the phase-corrected output signal 7 of the phase corrector 6 and the identification/decision output signal 9 of the identification/decision part 8 are applied to the first phase comparator 10, and the resultant output signal 11 of the phase comparator 10 represents the phase error $\psi_{ji}$ between these two input signals 7 and 9. This phase error signal 11 is applied to the first loop filter 12 which determines the characteristic of the first phase control loop 100, and the output signal 13 of the loop filter 12 is applied to the integrator 14. The integrator 14 generates a phase correction signal 15 representing a phase correction factor $\psi_i$, and this phase correction signal 15 is applied to the sine wave generator 16 which generates an output signal 17 representing a sine value relative to the input value $\psi_i$ provided by the phase correction signal 15. The output signal 17 of the sine wave generator 16 is applied to the phase corrector 6 to control the operation of the phase corrector 6 correcting the phase of the equalized output signal 5 of the automatic equalizer 4.

The second phase control loop 101 is a closed loop which includes the signal delay attributable to the presence of the signal delay elements included in the automatic equalizer 4. In this second phase control loop 101, the identification/decision output signal 9 of the identification/decision part 8 and the equalized output signal 5 of the automatic equalizer 4 are applied to the second phase comparator 18, and the resultant output signal 19 of the phase comparator 18 represents the phase error $\psi_{oi}$ between these two input signals 9 and 5. This phase error signal 19 is free from the effect of phase correction by the first phase control loop 100 as shown in FIG. 3. Thus, this second phase control loop 101 can be made independent of the first phase control loop 100. The phase error signal 19 is applied to the second loop filter 20 and appears as an output signal 21 representing a phase correction factor $\psi_o$. This signal 21 is fed back to the carrier-demodulation VCO 22 generating the demodulation carrier. Thus, the second phase control loop 101 controls the phase of the demodulation carrier.

Figure 4:
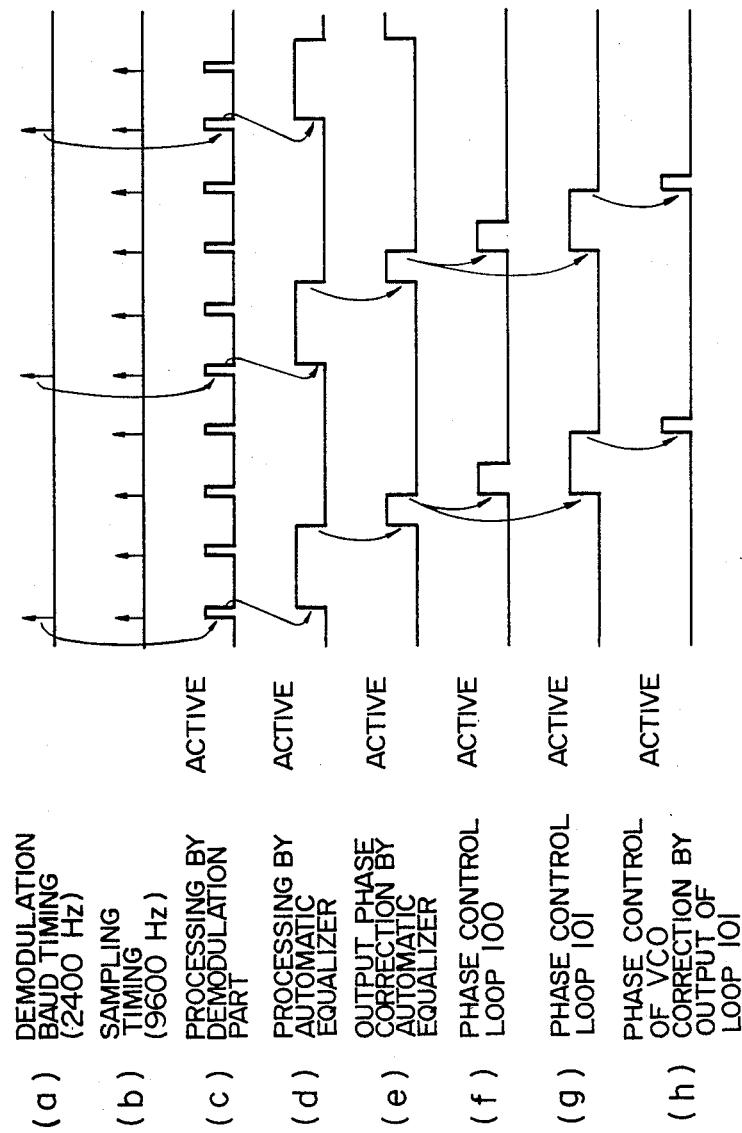
FIGS. 4a–h are a timing chart illustrating the timing of operation of the embodiment shown in FIG. 1.

The timing of the aforementioned operation of the first embodiment of the present invention will now be described with reference to a timing chart shown in FIG. 4. In the case of the embodiment of the present invention, signals are processed in a digital fashion. In FIG. 4, it is assumed again that the phase control device receives an input signal transmitted at a modulation speed of 2400 baud recommended as V.29 by the CCITT. A sampling speed of 9600 Hz is employed in FIG. 4 by way of example. However, this sampling speed may be set at any desired frequency which is two or more times as high as that of a communication band in which foldover noise can be prevented.

Figure 5:
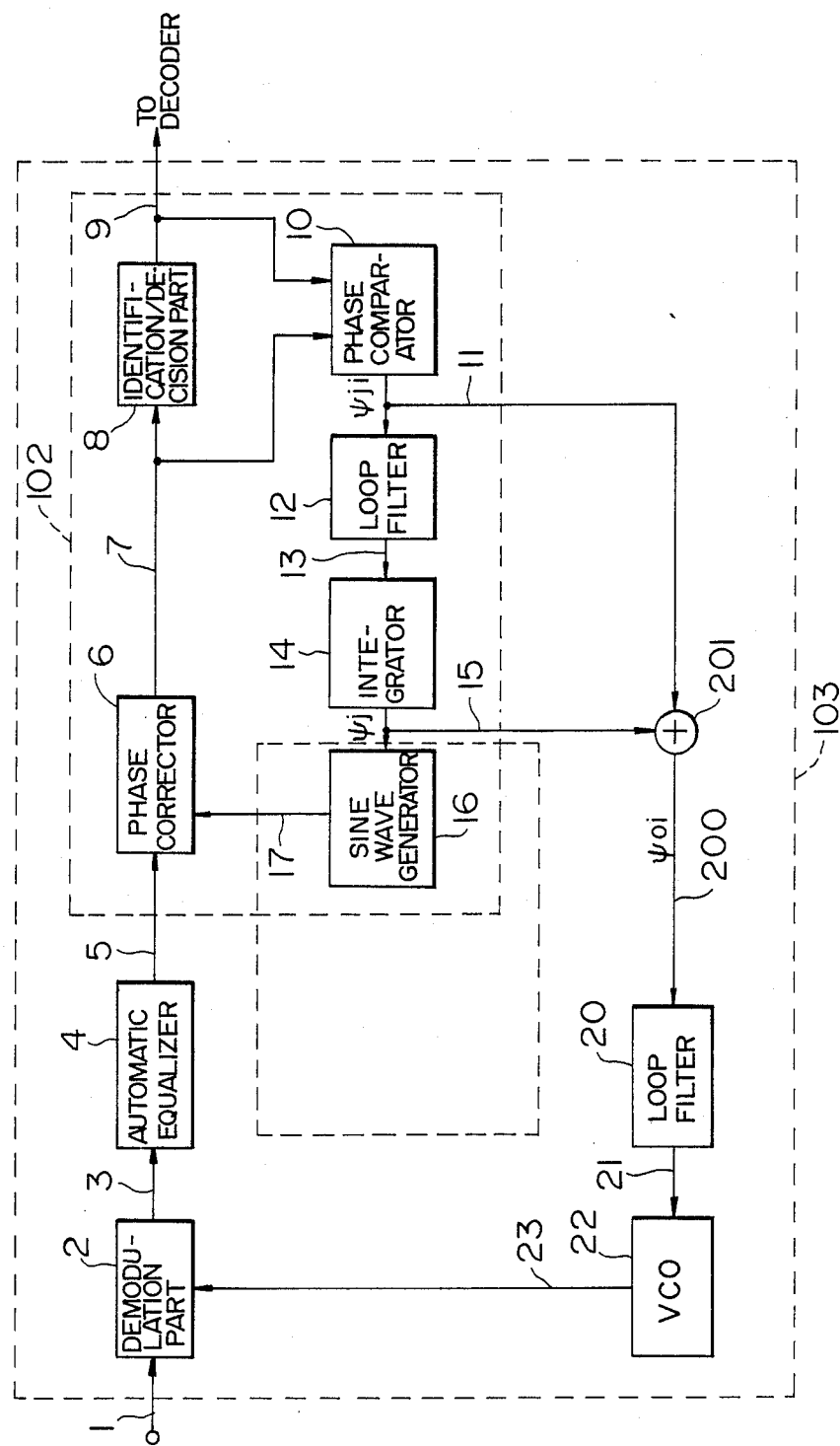
FIG. 5 is a block diagram showing the structure of another embodiment of the present invention.

An input signal demodulated according to the sampling timing described above is applied to the automatic equalizer 4 in synchronism with the baud timing of the received signal so as to remove distortion included in the signal. That is, the processing for automatic equalization becomes active, and the processing for correction of the phase of the output signal of the automatic equalizer 4 is then executed. Then, the first phase control loop 100 and the second phase control loop 101 operate according to the phase error of the input so as to update the amount of phase correction. When these two phase control loops 100 and 101 can execute the phase control in a parallel mode, the phase control may be executed in parallel relation as shown in FIG. 4. On the other hand, when these two phase control loops 100 and 101 can execute the phase control in a sequential mode only, the phase control may be executed in sequential relation without regard to the order to the phase control loops. However, in the case of a second embodiment as shown in FIG. 5 and described later, processing by a first phase control loop 102 must be executed earlier than processing by a second phase control loop 103. The updated phase-corrected output signal of the first phase control loop 100 is used for correction of the phase of the equalized signal 5 generated from the automatic equalizer 4 at the next baud timing. On the other hand, the updated phase-corrected output signal of the second phase control loop 101 is fed back to the carrier-generation VCO 22, so that the effect of phase correction is reflected at the time of signal demodulation according to the next sampling timing. That is, the requirement is such that the phase control by the two phase control loops is completed within the period of one baud.

In the manner described above, the two phase control loops 100 and 101 operate independently of each other to generate output signals updated every baud timing so as to minimize the phase error attributable to the phase fluctuation occurring in the signal transmission system.

As described already, the second phase control loop 101 is featured in that it includes a signal delay attributable to the presence of the signal delay elements in the automatic equalizer 4, while the first phase control loop 100 is featured in that it does not include such a signal delay. Therefore, the first phase control loop 100 is preferably designed so that it has a high capability of removing a phase fluctuation such as a phase jitter which changes relatively rapidly, while the second phase control loop 101 is preferably designed so that it has a high capability of removing a phase fluctuation such as a frequency offset which changes relatively slowly. Thus, the different phase control loops can correct the different characteristics independently of each other, and this facilitates the design of the phase control device.

FIG. 5 is a block diagram showing the structure of another embodiment of the present invention. In FIG. 5, the reference numerals 102, 103 and 201 designate a first phase control loop not including a signal delay part, a second phase control loop including a signal delay part, and an adder, respectively, and the same reference numerals are used to designate the same or equivalent parts appearing in FIG. 1.

Referring to FIG. 5, the structure of the first phase control loop 102 is entirely the same as that of the first phase control loop 100 incorporated in the first embodiment shown in FIG. 1. On the other hand, although the second phase control loop 103 corresponds to the second phase control loop 101 incorporated in the first embodiment shown in FIG. 1, this second phase control loop 103 differs from the second phase control loop 101 shown in FIG. 1 in the manner of deriving a phase error signal 200 applied to the second loop filter 20. More concretely, the phase error signal 11 representing the phase error $\psi_{ji}$ detected in the first phase control loop 102 is generated from the phase comparator 10 in the first phase control loop 102 as a result of phase comparison, while the phase correction signal 15 representing the required amount of phase correction $\psi_j$ is generated from the integrator 14 in the first phase control loop 102, and these signals 11 and 15 are added in the adder 201 in the second phase control loop 103 to provide the phase error signal 200. Consequently, this phase error signal 200 is entirely the same as the phase error signal 19 generated from the second phase comparator 18 provided in the second phase control loop 101 shown in FIG. 1. The manner of signal processing in the second embodiment will be described with reference to FIG. 3 again. In FIG. 3, the signal point D is shifted in a manner as shown by a broken arrow E until the signal point D is shifted to the signal point C as a result of phase correction only by the second phase control loop 103. Therefore, the first phase control loop 102 and the second phase control loop 103 in the second embodiment having the structure described above operate independently of each other, and the second embodiment shown in FIG. 5 exhibits the same functions and effects as those of the first embodiment described with reference to FIG. 1.

The aforementioned embodiments have referred to an application of the present invention to a demodulator incorporated in a MODEM performing under V.29 recommended by the CCITT for use in a data transmission system. However, the present invention is in no way limited to such a specific application, and it is apparent that the present invention is equally effectively applicable to all of wire and wireless data transmission systems of phase modulation type and quadrature amplitude modulation type where a signal delay time occurs after synchronous demodulation of an input signal but before identification/decision of the demodulated signal. That is, the present invention is applicable to a phase control device in which it is necessary to make a phase control loop not including such a signal delay and a phase control loop including such a signal delay operate independently of each other.

It will be understood from the foregoing detailed description of preferred embodiments of the present invention that the phase control device includes a phase control loop not including a signal delay and a phase control loop including such a signal delay, and these phase control loops operate independently of each other. This arrangement eliminates complication of the design in which interaction between these phase control loops must be taken into consideration. Therefore, the phase control loops can be separately designed so that the controllability end stability of the signal receiving system can be improved in spite of the simple structure of the phase control device. Further, even when the specifications, design standards, etc. of the phase control device are to be changed, the design satisfying the requirements can be easily achieved.

We claim:

1. A phase control device incorporated in a demodulator including a signal delay part, said phase control device comprising:
   a first phase control loop not including said signal delay part; and
   a second phase control loop including said signal delay part and a portion of this second phase control loop being connected to said first phase control loop, said second phase control loop receiving an input signal wherein any input signal received by said second phase control loop is not affected by an output signal of said first phase control loop.

2. A phase control device incorporated in a demodulator including a modulation part at its input side and an identification/decision part at its output side to demodulate data from a modulated signal received at its signal input terminal, said phase control device comprising, between said demodulation part and said identification/decision part:
   a first phase control loop not including a signal delay part; and
   a second phase control loop including said signal delay part and a portion of this second phase control loop being connected to said first phase control loop,
   said first and second phase control loops including means for generating phase error signals independent of each other, whereby said first and second phase control loops can operate independently of each other.

3. A phase control device incorporated in a demodulator including a signal delay part, said phase control device comprising:
   a first phase control loop not including said signal delay part; and
   a second phase control loop including said signal delay part and a portion of this second phase control loop being connected to said first phase control loop, said second phase control loop including means for receiving two signals applied from an input stage and an output stage respectively of said first phase control loop to generate a phase error signal.

4. A phase control device incorporated in a demodulator including a signal delay part, said phase control device comprising:
   a first phase control loop not including said signal delay part; and
   a second phase control loop including said signal delay part and an operation part and a portion of this second phase control loop being connected to said first phase control loop, said operation part receiving two signals from said first phase control loop and arithmetically processing said signals to generate an output signal which is free from the influence of said first phase control loop and which is applied as an input to said second phase control loop.

5. A phase control device incorporated in a demodulator including an equalizer causing a signal delay and an identification/decision part identifying and deciding that a received modulated signal corresponds to one of a plurality of reference signal points, said phase control device comprising:
   a first phase control loop forming a loop at a stage following said equalizer and including a phase comparator receiving an input signal and an output signal of said identification/decision part as inputs and generating an output signal representing the phase error between said inputs; and
   a second phase control loop including said equalizer and a portion of this second phase loop being control connected to said first phase control loop, said second phase control loop including a phase comparator receiving the output signal of said identification/decision part and an output signal of said equalizer as inputs and generating a phase a phase error signal representing the phase error between said inputs.

6. A phase control device incorporated in a demodulator including an equalizer causing a signal delay and an identification/decision part identifying and deciding that a received modulated signal corresponds to one of a plurality of reference signal points, said phase control device comprising:
   a first phase control loop forming a loop at a stage following said equalizer and including a phase comparator receiving an input signal and an output signal of said identification/decision part as inputs and generating an output signal representing the phase error between said inputs; and
   a second phase control loop including said equalizer and a portion of this second phase control loop being connected to said first phase control loop including an adder receiving the output signal of said phase comparator and an output signal of said first phase control loop as inputs and generating an output signal which is free from the influence of said first phase control loop.

* * * * *